US010123192B2

(12) United States Patent
Chaubert et al.

(10) Patent No.: US 10,123,192 B2
(45) Date of Patent: Nov. 6, 2018

(54) SYSTEM FOR PROVIDING ACCESS TO CONDITIONAL ACCESS MEDIA CONTENT

(71) Applicant: SMARDTV S.A., Cheseaux-sur-Lausanne (CH)

(72) Inventors: Eric Chaubert, Gland (CH); David Servignat, Ceyreste (FR)

(73) Assignee: SMARDTV S.A., Cheseaux-sur-Lausanne (CH)

( * ) Notice: Subject to any disclaimer, the term of this patent is extended or adjusted under 35 U.S.C. 154(b) by 0 days.

(21) Appl. No.: 14/962,514

(22) Filed: Dec. 8, 2015

(65) Prior Publication Data
US 2016/0174019 A1 Jun. 16, 2016

(30) Foreign Application Priority Data
Dec. 12, 2014 (EP) .................................. 14197746

(51) Int. Cl.
H04B 5/00 (2006.01)
H04W 4/80 (2018.01)
H04N 21/41 (2011.01)
H04N 21/414 (2011.01)
H04N 21/4363 (2011.01)
(Continued)

(52) U.S. Cl.
CPC .......... *H04W 4/80* (2018.02); *H04N 21/4104* (2013.01); *H04N 21/41407* (2013.01); *H04N 21/43637* (2013.01); *H04N 21/4436* (2013.01); *H04N 21/4623* (2013.01); *H04W 12/08* (2013.01)

(58) Field of Classification Search
CPC .......... H04N 21/4104; H04N 21/4436; H04W 12/08; H04W 4/008

USPC ................................................ 455/41.1, 41.2
See application file for complete search history.

(56) References Cited

U.S. PATENT DOCUMENTS 7,697,686 B2     4/2010  Puiatti et al.
2006/0103535 A1* 5/2006  Pahlaven ............. G06K 7/0008
                                                  340/572.1
(Continued)

FOREIGN PATENT DOCUMENTS

EP          2779671          9/2014

OTHER PUBLICATIONS

U.S. Appl. No. 14/204,391, 2014-0259181, filed Sep. 11, 2014.
(Continued)

Primary Examiner — Raj Chakraborty
(74) Attorney, Agent, or Firm — DLA Piper LLP US

(57) ABSTRACT

The present invention relates to a system and a device for conveniently providing rights to particular conditional access protected digital media content. A sleeve for covering a reception device for receiving the conditional access content is provided. The sleeve comprises a proximity wireless communications module including an antenna and a control chip. The reception device may be a set-top box, a telephone, a tablet computer or the like, as long as it is capable of receiving conditional access content, and may be used along with a detachable security module for decrypting control words to allow the content to be decrypted. The owner of such a reception device may purchase the sleeve which contains the rights to access conditional access content and when the sleeve is mounted on the reception device the rights are granted to the reception device by way of the proximity communications means.

11 Claims, 2 Drawing Sheets

(51) Int. Cl.
*H04N 21/443* (2011.01)
*H04N 21/4623* (2011.01)
*H04W 12/08* (2009.01)

(56) References Cited

U.S. PATENT DOCUMENTS

| | | | |
|---|---|---|---|
| 2007/0282707 | A1 | 12/2007 | Karaoguz et al. |
| 2008/0028434 | A1 | 1/2008 | Drazin |
| 2010/0197383 | A1 | 8/2010 | Rader et al. |
| 2011/0183717 | A1* | 7/2011 | Brede ............... H04L 63/0853 455/558 |
| 2012/0071214 | A1* | 3/2012 | Ash, Jr. ............... H01Q 1/243 455/571 |
| 2012/0185695 | A1 | 7/2012 | Shah et al. |
| 2012/0204206 | A1 | 8/2012 | Gutierrez Prieto et al. |
| 2014/0020073 | A1 | 1/2014 | Ronda et al. |
| 2014/0127995 | A1* | 5/2014 | Hendricksen ........ H04B 5/0056 455/41.1 |
| 2014/0152425 | A1* | 6/2014 | Valentine .............. G06F 3/00 340/10.51 |
| 2014/0259181 | A1* | 9/2014 | Wendling ............. H04L 63/10 726/27 |
| 2014/0273822 | A1 | 9/2014 | Gutierrez |
| 2015/0116296 | A1* | 4/2015 | Greene ................ G09G 3/20 345/211 |
| 2015/0363988 | A1* | 12/2015 | Van Wiemeersch ..... H04M 1/11 455/557 |

OTHER PUBLICATIONS

U.S. Appl. No. 15/346,087, filed Nov. 8, 2016.
U.S. Appl. No. 14/204,391.
U.S. Appl. No. 15/346,087.
U.S. Appl. No. 14/204,391, 2014-0259181, filed Sep. 11, 2014, now U.S. Pat. No. 9,525,688.
U.S. Appl. No. 15/346,087, 2017-0055035, filed Feb. 23, 2017.
European Search Report issued in European Application No. 14158739 dated Mar. 2, 2015.
European Search Report issued in European Application No. 14197746 dated Jun. 11, 2015.
Russell Holly, "NFC Case for the iPhone Landing Shortly...If Apple Says Ok", retrieved from http://www.geek.com/apple/nfc-case-for-the-iphone-1467957/, dated Feb. 16, 2012 (4 pages).
Rian Boden et al., "Wireless Dynamics Launches NFC Case for iPhone 5", retrieved from http://www.nfcworld.com/2013/06/13/324597/wireless-dynamics-launches-nfc-case-for-iphone-5/, dated Jun. 13, 2013 (4 pages).

* cited by examiner

SYSTEM FOR PROVIDING ACCESS TO CONDITIONAL ACCESS MEDIA CONTENT

CROSS REFERENCE TO RELATED APPLICATIONS

This application claims the benefit of European Patent Application No. 14197746.2 filed 12 Dec. 2014, the entire contents of which are hereby incorporated by reference herein.

TECHNICAL DOMAIN

The present invention generally relates to the domain of short-range wireless communication, such as NFC (near-field communication) or RFID (radio frequency identification). More particularly, the invention is directed towards conditional access within the short-range wireless communication environment. Embodiments of the invention may be deployed within, or otherwise associated with, a consumer device incorporating conditional access features.

STATE OF THE ART

Embodiments of the present invention may be deployed in consumer devices which feature wireless communication capabilities, such as set-top boxes (STB), tablet computers or portable telephones.

STBs are generally known in the state of the art for receiving digital media content and are often used in combination with a detachable conditional access module to facilitate access to the content when it is protected using one of the known conditional access content protection schemes. The conditional access module is used to securely store security information such as keys for decrypting control words for decrypting the content. The decryption of the control words or the content is allowed only if the conditional access module has the necessary rights for doing so. These rights can be obtained when the conditional access module purchases them from the content owner and the rights may be downloaded into the conditional access module or may be loaded into the conditional access module upon purchase. Some decryption keys may be received in encrypted format within the content to be decrypted. Other consumer devices such as mobile phones or tablet computers perform the conditional access functions using digital rights management techniques, where the rights are stored in a file on the device. In all of these systems, a verification step is performed to check whether the device has the necessary rights to decrypt the content before the decryption is allowed.

Mobile telephones or tablet computers and other such devices are sometimes considered by their owners to be fragile in nature and so some owners choose to provide their devices with a first line of defense against damage due to mechanical shocks or abrasions by applying a protective shield accessory in the form of a covering, housing or wallet or the like. These protective accessories are usually arranged to match, fit or otherwise follow the physical shape of the device and may come in various materials such as synthetic or natural, woven or non-woven materials such as fabrics or plastics or leather for example. As well as providing mechanical protection to the device, these accessories are sometimes considered by their owners to provide a means for visually personalising their devices.

Accessories in the form of sleeves are known in the state of the art for protecting devices which use RFID, NFC or other form of proximity wireless technology, from being solicited without the owner's knowledge. Such sleeves therefore are characterized in that they provide a certain level of electromagnetic shielding to the device to be protected, thereby substantially reducing any possibility of a third party entering into communication with the thus-protected device without the owner's knowledge. Sleeves in this context are therefore often referred to as shields since they are aimed at shielding or otherwise blocking wireless communication with the device on which they are deployed, thereby disabling any attempt for data to be read from or written to the thus-shielded device.

Sleeves are known in the state of the art for adding NFC capability to a smart-phone, usually for ticketing or payment purposes or in the transit and retail markets. When such a sleeve is used in conjunction with a smart-phone, it can be considered to effectively transform the smart-phone into the equivalent of a contactless access card.

NFC-capable smart-phones make convenient payment or access devices for ticketing or payment purposes in the transit and retail markets. The convenience comes from the fact that a great many people already use smart-phones and by including the NFC capability in the smart-phone, the user does not have to carry any additional cards, badges or tickets. Many smart-phones however, especially older ones, do not support NFC functionality. In order to provide NFC capability to those whose mobile telephones do not incorporate it, sleeves have been developed which themselves incorporate the NFC functionality. The sleeve and phone combination does not add NFC capability to the phone however, instead it is the sleeve itself which comprises the NFC capability. Associating the sleeve with the phone is simply seen as a convenient way of facilitating the deployment of the NFC functionality since people often have their phones with them and some people like to use phone covers. The gesture of using the phone/cover combination to provide access is also reminiscent of the gesture using an NFC-enabled phone. In the ticketing or payment applications in the transit and retail domains, it is usual for transactions to be facilitated using a credit card sized object or a smartcard with NFC functionality. It can be said therefore, that using a mobile phone with the NFC-enabled cover is similar to having a contactless card which can be clipped onto the mobile phone.

In the above case, the mobile phone itself does not contribute in a technical way to arriving at the desired goal, instead it is the NFC-enabled sleeve which functions as a contactless credit card. These NFC sleeves are generally made of plastic and can clip onto the mobile phone. A number of different manufacturers produce such sleeves (covers), some even further providing mechanical protection to the phone. The sleeves are all similar in design and construction and contain, in the body of the sleeve, a contactless antenna, a secure element chip, an NFC controller chip and a connector to the phone. The connector enables the sleeve to be powered by the phone's battery and a software development kit allows for, say, a mobile banking application ("wallet" function), to communicate directly with the secure element and the NFC controller. Communication is with a terminal configured to perform the ticketing or purchase function by communicating with the NFC-enabled sleeve (or phone).

BRIEF SUMMARY OF THE INVENTION

In order to address one or more problems related to existing problems in the field of conditional access to media content, there is disclosed a sleeve for providing access to conditional access digital media content received via a reception device when the reception device has access to a particular right, the sleeve comprising a proximity wireless communications tag embedded within the body of the sleeve, the proximity wireless communications tag being configured to set up a proximity wireless communications channel towards the reception device when the sleeve and the reception device are within a predetermined proximity distance from each other and to pass the particular right to the reception device via the proximity wireless communications channel;
characterised in that:
the sleeve is adapted to at least partly cover the reception device and, thus arranged, to be visible at least to a person to whom, or for whom, the particular right has been granted.

Embodiments of the present invention may be deployed in a covering intended to be placed around a consumer device for receiving digital media content, such as a conditional access module, a set-top box, a tablet computer or a portable communications device such as a smart-phone for example. From the point of view of a content provider who would like to provide an opportunity for communicating a promotional message related to content he provides, he could find advantage in including his message, in visible format (a logo or other graphic for example), on a sleeve or cover intended to be used on the device (a set-top box or tablet computer for example) used for receiving his content. Thus, a sleeve which can fit around a set-top box which can be used to receive conditional access world cup football matches might have a world cup logo printed on it, or any other promotional message likely to be advertised during a football match. The object of customising the set-top box (or other reception device) is thereby met while the further object of providing the rights to watch a particular content is also satisfied.

The visual aspect of a STB (phone/tablet etc) can therefore be customised using a sleeve in which a proximity wireless communications device is deployed (e.g. NFC tag or RFID tag), thereby allowing for certain rights to be granted to the STB. The system can be used to grant rights to certain audio/video assets, to provide a means for storing a user ID on the STB (or a device to which the STB has access) or for storing an ordered list of favourites for example. In some embodiments the sleeve is conspicuous to persons situated in sufficiently close physical proximity the STB (or other reception device), thereby providing a readily visible cue to the fact that a protected content is currently accessible or to the fact that a particular media content is being or may be viewed or a particular type of right is currently granted.

BRIEF DESCRIPTION OF THE DRAWINGS

The present invention will be better understood thanks to the detailed description which follows and the accompanying drawings, which are given as non-limiting examples of embodiments of the invention, namely.

DETAILED DESCRIPTION

Figure 1:
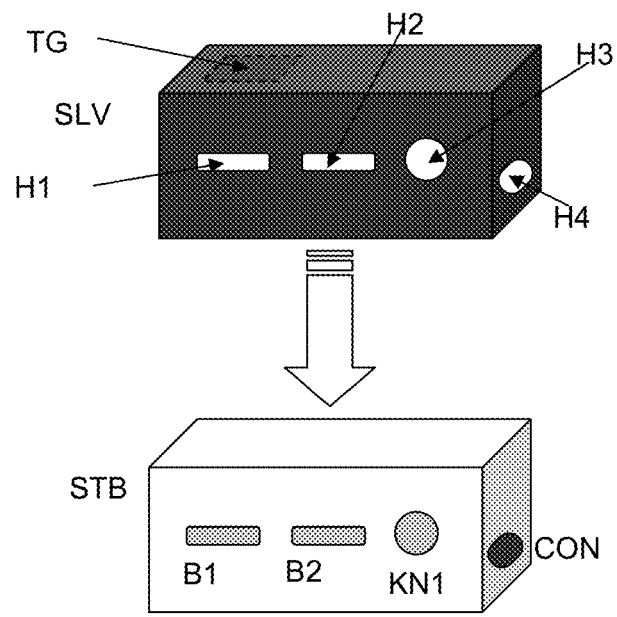
FIG. 1, showing a proximity wireless-enabled sleeve and a proximity wireless-enabled set-top box according an embodiment of the present invention.
Figure 2:
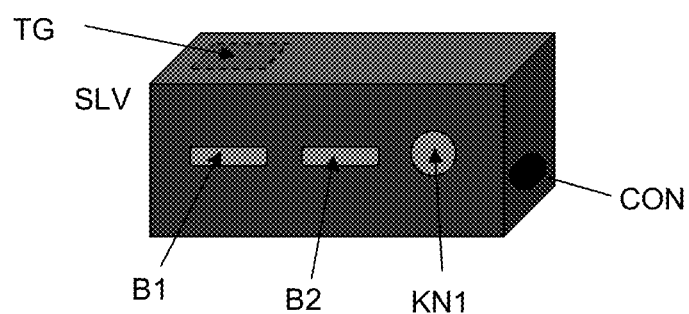
FIG. 2, showing a sleeve mounted on a set-top box, according to an embodiment of the present invention.
Figure 3:
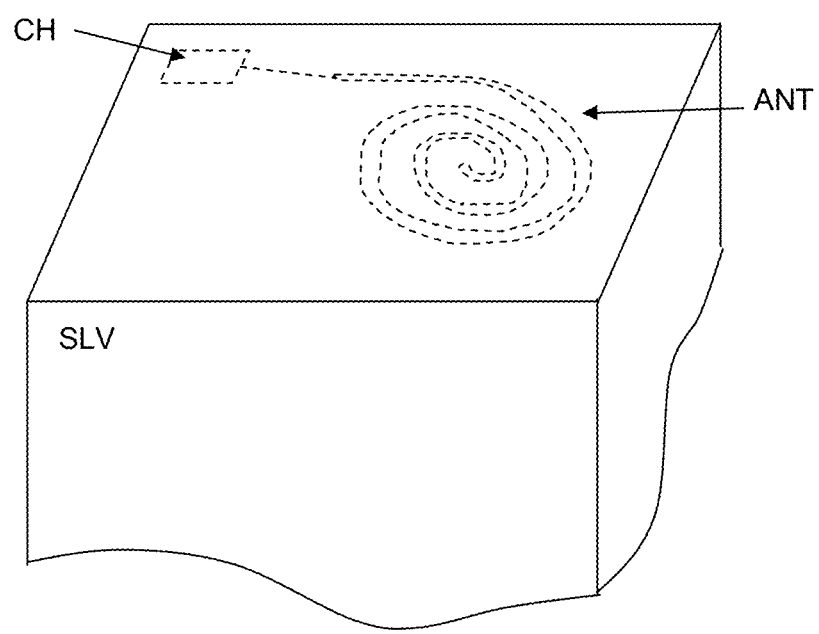
FIG. 3, showing a chip and an antenna mounted in a sleeve according to an embodiment of the present invention.

Protective or decorative covers or sleeves can be used around portable electronics devices to either protect them from damage or customise their look or a combination of both. According to embodiments of the present invention, such protective or decorative sleeves or covers are adapted to include proximity wireless communications technology to communicate with the device to which it is designed to provide protection or decoration. The sleeve (SLV) embeds a proximity wireless communications means including an antenna and a control chip. Proximity wireless communications means are suitable for performing wireless communications between participants when said participants are within distances of up to a few inches of each other. As such, proximity wireless communications devices usually include proximity sensors to detect the strength of a received RF signal and are configured to categorise the strength of the detected signal as being either within or outwith a predetermined proximity distance. When the signal is within the predetermined proximity distance, a communication channel may be set up between the participants.

According to an embodiment of the present invention, there is provided a sleeve (SLV) or cover for use with a reception device (STB) used for receiving conditional access digital media content, such as a set-top box, a mobile telephone or a tablet computer for example. In a system in which an embodiment of the present invention may be deployed, the reception device (STB) comprises a proximity wireless communications module for communicating with the sleeve (SLV) and the sleeve (SLV) comprises a proximity wireless communications module for communicating with the reception device (STB) when the reception device (STB) and the sleeve (SLV) are suitably close to one another, preferably when the sleeve (SLV) is deployed over the reception device (STB).

According to an embodiment, the proximity wireless communications module in the sleeve comprises an antenna, a radio transceiver and a base-band processor deployed within the body of the sleeve. This module is sometimes referred to as a proximity wireless communications tag (TG). The antenna is connected to the radio transceiver, controlled by the base-band processor for performing the proximity wireless communications function. The transceiver and the processor may be realised as one or more chips, which generally include or at least have access to a memory in which an identifier may be stored. At least part of the memory can be used to store a unique identifier or secret keys, these parts of the memory therefore being secure in that they are configured not to be overwritten by unauthorised processes. A read only memory can be considered to be secure in this case since it cannot be overwritten.

According to one embodiment, a security module is embedded in the sleeve. The security module can be used to store secure values such as keys, rights or identifiers or to perform secure functions such as cryptographic functions. The security module is embedded within the sleeve in such a way as to make it tamper-proof. Any unauthorised attempt to access the security device by electronic or mechanical means is protected against using any of the known means within the conditional access domain. In embodiments where the sleeve comprises a security module, the keys or rights are transmitted to the reception device to allow the reception device to decrypt the protected content.

In all of the embodiments of the present invention, the sleeve includes a proximity wireless tag (TG) for storing and transmitting a control value to the reception device when the latter comes within a range of the sleeve which allows for communication to take place, preferably when the sleeve is deployed over the reception device. The control value, when loaded into the reception device, provides the reception device with a particular right for accessing a particular content. When the right is present, the reception device is authorised to decrypt the particular content. Without the presence of the particular right, access to the particular content is not permitted and the reception device is not allowed to decrypt the particular content. In a system in which an embodiment of the present invention is deployed, the reception device comprises proximity wireless communications circuitry for communicating with the sleeve thereby allowing it to receive the rights from the sleeve.

According to one embodiment, when the sleeve does not comprise a security module, the reception device comprises a security module. Some reception devices are configured to receive a detachable security module. Such security modules are known in the form of an integrated circuit embedded within a smartcard for example. In this embodiment, the right, transferred from the sleeve, is stored in a secure manner on the security module. In a conventional manner, the content is received by the reception device in encrypted form along with electronic control messages (ECM). The security module decrypts ECM to get the control words which were used to encrypt the content and to discover which rights are necessary to view the content. If the correct rights are present in the security module, then the decryption module (which can be in the reception device or on the security module) is allowed to decrypt the content.

The reception device cannot be used without the sleeve to view the particular content because it can only receive the rights to view the particular content from the sleeve. According to an embodiment, the right is not transferred to the security module when the sleeve is placed on the reception device but is instead stored within a memory within the sleeve. When the security device (or the security module associated with the security device) is required to check whether or not the particular right for watching the particular content is present, it uses the proximity wireless communications channel between the reception device and the sleeve to verify whether the right exists on the sleeve.

According to different embodiments, the presence of the particular right can grant the reception module the right to decrypt the particular content or it could grant the reception module to right to decrypt the particular content under favourable conditions whereby the user would be able to access the content at a cheaper monetary rate for example.

A set-top box according to an embodiment of the present invention may be described as inactivated or otherwise configured for a default user when not in the presence of a sleeve. The set-top box may be described as being activated when a sleeve having a proximity wireless tag (TG) according to an embodiment of the present invention is placed around the set-top box. Activation may be administered locally, whereby a right is communicated from the sleeve to the set-top box using the proximity wireless communications means. Otherwise, activation may occur through the intervention of a head-end or subscriber management centre.

Activation, according to some embodiments of the present invention, is achieved while the sleeve is mounted on the reception device. Embodiments in which the right or control value remains on the sleeve are suitable for this type of activation. According to other embodiments, especially those in which the right or control value is transferred, or copied, from the sleeve to the reception device or the security module in the reception device, activation may continue when the sleeve is removed from the reception device.

According to an embodiment of the present invention, where a subscriber management centre is used, the sleeve may communicate a unique ID to the reception device thereby proving that an authorised sleeve is being used with the reception device. The subscriber management centre then records the fact that the reception device is being used with a valid sleeve, thereby permitting the rights to be sent to the reception device via the known method of Electronic Management Messages) EMMs.

In embodiments of the present invention which do not need the intervention of the management centre, a simple and convenient method for providing rights is thereby provided since by simply purchasing an appropriate sleeve and attaching it on to the reception device, the reception device receives the necessary rights to view the particular content in a simple and convenient manner. Without the intervention of a head-end, a viewer can obtain rights to view content while retaining a certain amount of anonymity.

In a living room environment, when the reception device is a set-top box, positioned in a manner where it is conspicuous within the room and visible to most viewers of the content provided by the reception device, the sleeve has some significance in the fact that it provides visual information to the users as to what content it provides access. The presence of the sleeve on, around or sufficiently close to the set-top box is indication that the set-top box is now enabled to provide access to a particular content. Embodiments of the present invention therefore provide an opportunity for a user to visually ascertain, with ease, whether or not he is likely to be able to access a particular paying content. Content for which access is to be paid, said access being granted by the presence of a right stored on a sleeve according to an embodiment of the invention, might be content intended for access to be restricted according to age. With the sleeve having a conspicuous red colour for example, a convenient form of parental control is made available whereby a parent who sees a child watching the TV while the red sleeve is placed around the set-top box can quickly remedy the situation by removing the sleeve from the set-top box, thereby preventing any possible access to said restricted access content. This a useful feature given that the set-top box could be in a central location of the house (in view of a parent for example) while the child could be viewing content on a screen in another part of the house. This easy solution to parental control is different from known parental control techniques involving the use of a secret code. If a child were to discover the secret code, for example by observing an adult while he enters the code or by discovering a copy of the code recorded on a piece of paper or in a computer file, then the child could still view the restricted content while his viewing device is out of view of the adult.

The sleeves or covers according to any of the embodiments described above, may be made of any suitable material. Such materials may be synthetic or natural, plastics, fabrics, metals, rubbers etc, as long as the material allows for the sleeve to be attached to the device housing the element to which rights are to be granted and as long as the material is suitable for concealing or otherwise incorporating a wireless antenna, and a controller chip or module for controlling the proximity wireless communication. A wireless antenna in the context of the present invention may mean for example NFC or RFID, although NFC is preferable since it is particularly suited to proximity wireless communications applications. According to some embodiments, the sleeve may further comprise a secure element (chip), especially embodiments in which the right is stored on the sleeve. The material of the sleeve may be flexible or rigid as long as it can be conveniently mounted over the reception device.

According to one embodiment, the sleeve is made from an elastic material, thereby allowing it to be stretched over the reception device such that when the sleeve returns towards its un-stretched state it fits snugly over the reception device.

Power for the circuitry within the sleeve may preferably be provided via wireless means according to one embodiment, where the transceiver in the sleeve receives power, via its antenna, from RF (radio frequency) signals received from the transceiver in the reception device. According to another embodiment, power can be provided via a wired contact to a power source. The power source may be external to the sleeve or it may be a slim battery for example, concealed within the sleeve. When the battery is external to the sleeve a wire may be provided to connect the external power source to the circuitry within the sleeve, the external power then usually being taken from a suitable socket on the reception device.

Protective or decorative sleeves according to embodiments of the present invention are form-fitting in that they are configured to fit over all or part of the reception device for which they are designed. When mounted on the reception device, the sleeve conforms to the shape of the reception device without interfering with any of the control mechanisms on the reception device, access to which is required for proper operation of the device. Where the reception device has a cuboid form of a certain dimension, the sleeve will have a cuboid form of similar dimensions or will be stretchable to a cuboid form of such dimensions and will have cut-away regions allowing access to the control buttons and access ports of the reception device to which access is required during normal operation. Similarly, for a reception device having a disc-shaped format of a given height and having a given circumference, the sleeve may be designed to have similar dimensions or at least be stretchable to those dimensions and have cut-away regions to leave buttons and access ports (USB, power for example) accessible. For a non-stretchable sleeve it can be said that it conforms to the shape of the device upon which it is intended to be mounted, whereas for a stretchable sleeve it can be said that, by way of its stretching properties, it moulds to, or otherwise adopts, the shape of the device upon which it is intended to be mounted.

An STB without a sleeve according to embodiments of the present invention provides a given amount of functionality, whereas a system according to embodiments of the present invention, including an STB according to the present invention, when fitted with a sleeve according to an embodiment of the present invention, provides the STB with further functionality, such as granting specific rights to access specific conditional access content. Sleeves according to the state of the art, when mounted on the STB however do not provide any of the further functionality.

The invention claimed is:

1. A system configured to provide access to conditional access content, the system comprising:
 a conditional access device configured to receive an encrypted digital media content from a content source and to provide access to the digital media content that has been received, said access being subject to a condition of the conditional access device having a particular right for decrypting the encrypted digital media content for said providing of access to the digital media content; and
 a sleeve comprising:
  a sleeve body; and
  a proximity wireless communications tag embedded within the sleeve body;
  the sleeve being adapted to at least partly cover the conditional access device so that the sleeve, thus arranged, is visible to a person using the conditional access device;
 wherein the conditional access device and the sleeve are configured to establish a proximity wireless communications channel when the sleeve and the conditional access device are within a predetermined proximity distance from each other, the proximity wireless communications channel being separate from a channel used by the device to receive the digital media content from the content source, and the sleeve is configured to pass the particular right from the proximity wireless communications tag to the conditional access device by the proximity wireless communications channel.

2. The system according to claim 1, wherein the sleeve body has a form which follows the form of at least part of the conditional access device while providing physical access to parts of the conditional access device which need to be manipulated or to which a physical connection needs to be made.

3. The system according to claim 1, wherein energy for powering the proximity wireless communications tag is obtained through radio frequency transmission from the conditional access device, received via the proximity wireless communications channel.

4. The system according to claim 1, further comprising a physical connector for connecting to a power socket on the conditional access device, wherein energy for powering the proximity wireless communications tag is obtained through the physical connector.

5. The system according to claim 1, further comprising a battery embedded within the sleeve body, wherein energy for powering the proximity wireless communications tag is obtained from the battery.

6. The system according to claim 1, wherein the sleeve is made from plastic.

7. The system according to claim 1, wherein the sleeve is made from natural or synthetic elastomeric material configured to fit over at least part of the conditional access device by stretching.

8. The system according to claim 1, wherein the proximity wireless communications tag comprises an antenna, a radio transceiver, and a base-band processor.

9. The system according to claim 8, wherein the radio transceiver and the base-band processor are housed on a chip.

10. The system according to claim 9, wherein the conditional access device has access to a security module, the security module being configured to allow decryption of the digital media content when the particular right is received from the sleeve.

11. The system according to claim 1, wherein the sleeve is placed on the conditional access device, at least partly around the conditional access device, or within a predetermined proximity distance from the conditional access device.

* * * * *